(12) United States Patent
Chakrabarti et al.

(10) Patent No.: US 9,830,169 B2
(45) Date of Patent: Nov. 28, 2017

(54) METHOD AND APPARATUS FOR REMOTELY DELIVERING SOFTWARE

(71) Applicant: Adobe Systems Incorporated, San Jose, CA (US)

(72) Inventors: Amrita Chakrabarti, Kolkata (IN); Ashish Kumar Agarwal, Meerut (IN); Priyank Jain, Bhopal (IN); Sanjeev Kumar Biswas, Bangalore (IN); Vikalp Gupta, Naya Bazaar (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 407 days.

(21) Appl. No.: 14/041,333

(22) Filed: Sep. 30, 2013

(65) Prior Publication Data

US 2015/0095905 A1    Apr. 2, 2015

(51) Int. Cl.
  *G06F 9/445*    (2006.01)
  *G06Q 30/00*    (2012.01)
(52) U.S. Cl.
  CPC ............... *G06F 9/445* (2013.01); *G06F 8/61* (2013.01); *G06Q 30/00* (2013.01)
(58) Field of Classification Search
  CPC .. G06F 9/445; G06F 8/61; G06F 8/63; G06Q 30/00
  See application file for complete search history.

(56) References Cited

U.S. PATENT DOCUMENTS

| | | | |
|---|---|---|---|
| 5,881,236 A | 3/1999 | Dickey | |
| 6,144,960 A | 11/2000 | Okada et al. | |
| 7,478,385 B2 | 1/2009 | Sierer et al. | |
| 7,707,573 B1 | 4/2010 | Marmaros et al. | |
| 8,074,216 B2 | 12/2011 | Tamura | |
| 8,595,186 B1 | 11/2013 | Mandyam et al. | |
| 9,002,864 B1* | 4/2015 | Payne | G06F 17/30876 707/756 |
| 2003/0217358 A1 | 11/2003 | Thurston et al. | |
| 2006/0048141 A1 | 3/2006 | Persson et al. | |
| 2007/0094501 A1 | 4/2007 | Takamizawa et al. | |
| 2008/0184221 A1 | 7/2008 | Rengarajan et al. | |

(Continued)

OTHER PUBLICATIONS

U.S. Appl. No. 13/739,157, dated Mar. 26, 2015, Office Action.

(Continued)

*Primary Examiner* — Wing F Chan
*Assistant Examiner* — Billy H Ng
(74) *Attorney, Agent, or Firm* — Keller Jolley Preece (57) ABSTRACT

A computer implemented method and apparatus for remotely delivering software. The method comprises installing a provisioning application on a first device, in response to accessing an advertisement for a software product; determining one or more second devices that are synchronized with the first device, wherein the one or more second devices are remote from the first device, and wherein the one or more synchronized second devices are not registered with a software provider of the software product; registering the one or more synchronized second devices with the software provider of the software product; receiving, from the first device, a selection of one or more of the registered devices for installation of the software product; and directing installation of the software product on the one or more selected registered devices.

20 Claims, 4 Drawing Sheets

(56) References Cited

U.S. PATENT DOCUMENTS

| | | | |
|---|---|---|---|
| 2008/0244057 A1* | 10/2008 | Kojima | G06F 8/61 709/223 |
| 2009/0007091 A1 | 1/2009 | Appiah et al. | |
| 2009/0106266 A1* | 4/2009 | Donatelli | H04L 67/306 |
| 2009/0282398 A1 | 11/2009 | Shen et al. | |
| 2009/0288079 A1 | 11/2009 | Zuber et al. | |
| 2010/0049838 A1* | 2/2010 | DeHaan | H04L 41/0809 709/221 |
| 2010/0071039 A1 | 3/2010 | Kashima | |
| 2010/0262953 A1 | 10/2010 | Barboni et al. | |
| 2010/0333084 A1* | 12/2010 | DeHaan | G06F 8/61 717/176 |
| 2011/0154135 A1* | 6/2011 | Tyhurst | G06F 8/61 714/57 |
| 2011/0175977 A1* | 7/2011 | Dahl | H04L 12/1822 348/14.12 |
| 2011/0185043 A1 | 7/2011 | Zeller et al. | |
| 2012/0096365 A1 | 4/2012 | Wilkinson et al. | |
| 2013/0019234 A1* | 1/2013 | Pardehpoosh | G06F 21/121 717/170 |
| 2013/0019237 A1 | 1/2013 | Pardehpoosh et al. | |
| 2013/0047150 A1 | 2/2013 | Malasky et al. | |
| 2013/0130662 A1* | 5/2013 | Schwartz | H04W 4/00 455/414.1 |
| 2013/0326502 A1* | 12/2013 | Brunsman | G06F 8/61 717/178 |
| 2014/0085652 A1* | 3/2014 | Yoshida | H04N 1/00228 358/1.13 |
| 2014/0173586 A1 | 6/2014 | Dugan | |
| 2014/0173695 A1* | 6/2014 | Valdivia | G06F 21/36 726/4 |
| 2014/0201730 A1 | 7/2014 | Biswas et al. | |
| 2015/0288761 A1* | 10/2015 | Lu | H04L 67/02 709/204 |

OTHER PUBLICATIONS

U.S. Appl. No. 13/739,157, dated Oct. 7, 2015, Office Action.
U.S. Appl. No. 13/739,157, dated May 11, 2016, Office Action.
Callaghan et al. "Client—server architecture for collaborative remote experimentation", 2005, IEEE.
Blanco et al. "Remote Data Service Installation on a Grid-enabled Java Platform", 2005, IEEE.
U.S. Appl. No. 13/739,157, dated Nov. 3, 2016, Notice of Allowance.

* cited by examiner

METHOD AND APPARATUS FOR REMOTELY DELIVERING SOFTWARE

BACKGROUND OF THE INVENTION

Field of the Invention

Embodiments of the present invention generally relate to software delivery and, more particularly, to a method and apparatus for remotely delivering software.

Description of the Related Art

Computers can be used to perform a variety of functions. As such, the value of products that people purchase using smartphones and tablets is growing rapidly. Software purchase and installation typically requires a user to be physically present and using the device for which the purchase is made. The activities related to download, installation and purchase are triggered from the device, and require the user's presence at the device. This hampers the user's experience and decreases software delivery and utilization efficiency.

Therefore, there is a need for a method and apparatus for remotely delivering software.

SUMMARY OF THE INVENTION

A method for remotely delivering software substantially is described. The method includes installing a provisioning application on a first device, in response to accessing an advertisement for a software product. The provisioning application determines one or more second devices that are synchronized with the first device, where the one or more second devices are remote from the first device, and where the one or more synchronized second devices are not registered with a software provider of the software product. The one or more synchronized second devices are then registered with the software provider of the software product. One or more of the registered devices are selected for installation of the software product; and the one or more selected registered devices are directed to install the software product.

In another embodiment, an apparatus for remotely delivering software is described. The apparatus includes a provisioning application and a browser extension. The provisioning application identifies a default browser on a first device. A browser extension is installed from an application store associated with the default browser. An email account that is used to log into the default browser on the first device is identified and, one or more second devices are identified that are also logged into the default browser using the identified email account, wherein the one or more second devices are remote from the first device and wherein the one or more second devices are not registered with a software provider of the software product. The browser extension is installed from the application store associated with the default browser on the one or more second devices. The browser extension registers the one or more second devices with a software provider of a software application.

In yet another embodiment, a computer readable medium for storing computer instructions that, when executed by a processor, perform a method for remotely delivering software is described. A provisioning application is installed on a first device, in response to accessing an advertisement for a software product. The provisioning application determines one or more second devices that are synchronized with the first device, where the one or more second devices are remote from the first device, and where the one or more synchronized second devices are not registered with a software provider of the software product. The one or more synchronized second devices are then registered with the software provider of the software product. One or more of the registered devices are selected for installation of the software product; and the one or more selected registered devices are directed to install the software product.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

While the method and apparatus is described herein by way of example for several embodiments and illustrative drawings, those skilled in the art will recognize that the method and apparatus for remotely delivering software is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for remotely delivering software defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for remotely delivering software. In one embodiment, a delivery control device, such as a smartphone, can select software to be delivered to a remotely located device, such as a desktop computer. A plurality of remotely located devices may be synchronized to the delivery control device such that all of the synchronized devices receive the software.

In one embodiment, when an advertisement for a software product (such as an application) is accessed from a delivery control device, one embodiment of the invention determines one or more second devices that are synchronized with the delivery control device. The one or more synchronized devices are registered with a software provider of the software application. The registered devices are presented to a user of the delivery control device such that one or more of the registered devices may be selected for installation of the software application. The embodiments facilitate installation of the software application.

Advantageously, the present invention provides a secure way to install software remotely, even on a new machine of a new user. This enables software providers, such as ADOBE Systems Incorporated, of San Jose, Calif. to convert print or digital ads into sales even when the purchaser is a new user to the software provider and has not registered any machines with the software provider prior to the time of purchase.

Various embodiments of a method and apparatus for remotely delivering software are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
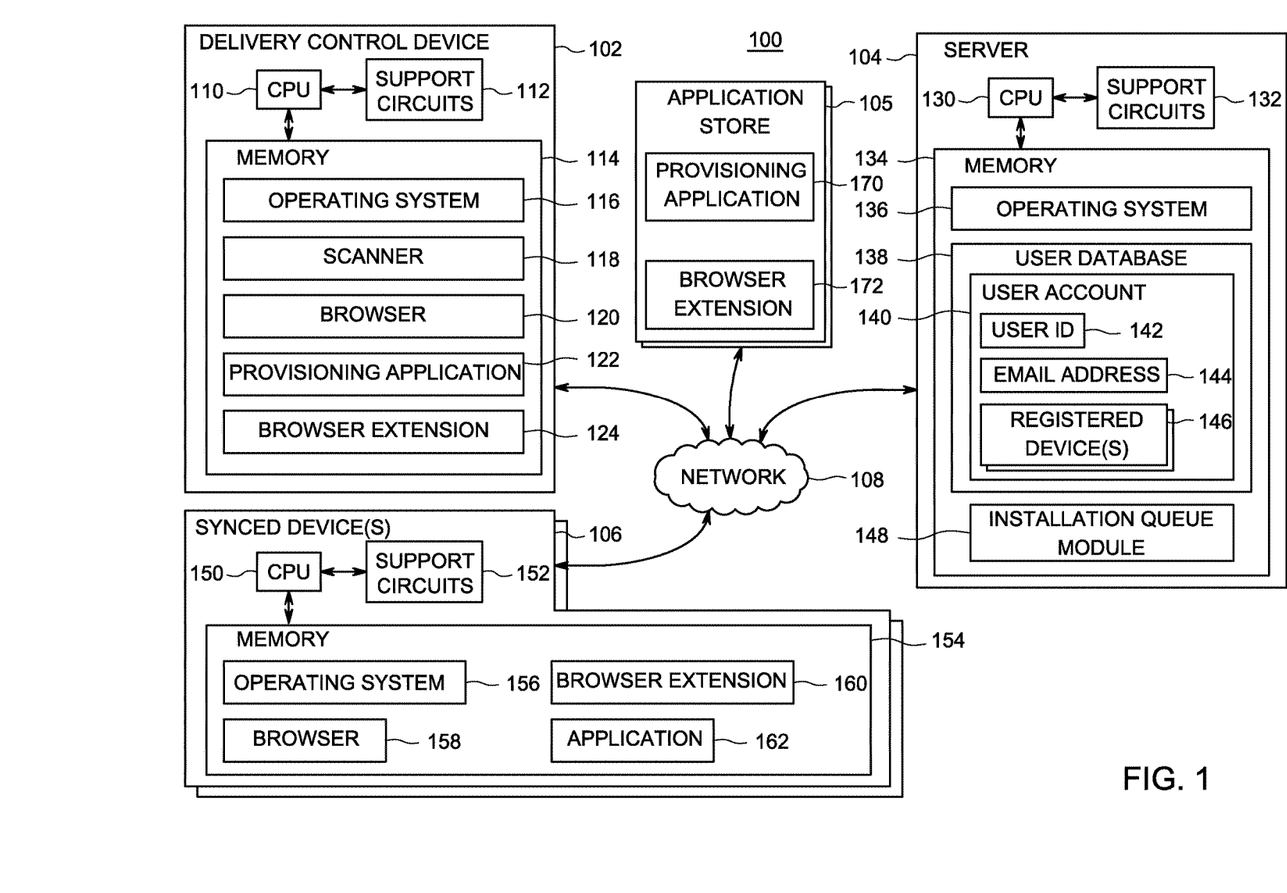
FIG. 1 is a block diagram of a system for remotely delivering software, according to one or more embodiments.

FIG. 1 is a block diagram of a system 100 for remotely delivering software, according to one or more embodiments. The system 100 includes a delivery control device 102, a server 104, one or more application stores 105, and one or more synchronized devices 106, all communicatively connected via a network 108. The delivery control device 102 is a computing device, for example, a laptop, desktop computer, tablet computer, a smartphone, and the like. The delivery control device 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, a scanner 118, a browser 120, a provisioning application 122, and a browser extension 124. The operating system 116 may include various commercially known operating systems.

The server 104 is a computing device, such as a desktop computer, laptop, tablet computer, and the like. The server 104 includes a Central Processing Unit (CPU) 130, support circuits 132, and a memory 134. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like.

The memory 134 includes an operating system 136, and a user database 138. The user database 138 includes a plurality of user accounts 140. Each user account 140 includes a userID 142, an email address 144, one or more registered devices 146, and an installation queue module 148. The operating system 136 may include various commercially known operating systems.

The application store 105 is an e-commerce mobile application store, for example, the APPLE® App Store or the GOOGLE® Play Store. The application store 105 includes an provisioning application 170 and a browser extension 172.

Each of the one or more synchronized devices 106 is a computing device, for example, a desktop computer, laptop, and the like. The synchronized device 106 includes a Central Processing Unit (CPU) 150, support circuits 152, and a memory 154. The CPU 150 may include one or more commercially available microprocessors or microcontrollers that facilitate data processing and storage. The various support circuits 152 facilitate the operation of the CPU 150 and include one or more clock circuits, power supplies, cache, input/output circuits, and the like. The memory 154 includes at least one of Read Only Memory (ROM), Random Access Memory (RAM), disk drive storage, optical storage, removable storage and/or the like.

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like.

A user may have one or more synchronized devices 106 in addition to the user's delivery control device 102. The one or more synchronized devices 106 are synchronized using the default browser 158 on the synchronized device 106. For example, a user may have a mobile device that is synchronized with both a laptop and a desktop device. When a user is away from home, the user typically carries their mobile device with them, and when the user sees an advertisement for a software product, the user may wish to purchase the software product for one or more of their synchronized devices 106. Thus, the user's mobile device acts as the delivery control device 102 that facilitates purchase and installation of the software product on one or more of the synchronized devices 106. In order to install the software product on one or more synchronized devices 106, the one or more synchronized devices 106 must be registered with the software provider. As such, when a user wishes to purchase a software product for a synchronized device 106, the delivery control device 102 first facilitates registering the synchronized device 106 with the software provider and then facilitates delivery and installation of the software product on the synchronized device 106.

When a user sees an advertisement for a software product that the user wishes to purchase, the user may either scan a Quick Response code (QR code) in a print ad using the scanner 118, click a download link in a digital ad via the browser 120, access ad information embedded in a near field communication (NFC) tag using a NFC feature of the mobile device, or use any method for accessing the advertisement known in the art that can provide a Universal Resource Locator (URL). The user is redirected to an application store 105 based on the operating system 116 of the delivery control device 102. For example, if the QR code is scanned from an IPHONE or an IPAD, the URL link directs the user to an Apple App Store 105. If the QR code is scanned from an Android device, the user is directed to a GOOGLE Play Store 105. The provisioning application 170 is downloaded from the Application store 105, stored on the delivery control device 102 as provisioning application 122, and executes on the delivery control device 102. The provisioning application 122 coordinates the delivery of the software product to the one or more synchronized devices 106.

The provisioning application 122 directs the user to the software provider's server 104 in order to create a user account 140 that includes a userID 142 and an email address 144. The delivery control device 102 is registered on the server 104 and the userID 142, email address 144 and registered device 146 are stored in the user account 140 in the user database 138. Thus, in embodiments disclosed herein, the delivery control device 102 may be considered a synchronized device 106, and may be alternately referred to herein as a first device of the synchronized devices 106.

A browser extension 124 is needed to register the synchronized devices 106 with the server 104. The provisioning application 122 determines the default browser for the delivery control device 102, directs the user to the browser's Application store 105, and downloads the browser extension 172. For example, if the default browser is CHROME™, the user is directed to the GOOGLE® Play Store. The browser extension 172 is stored on the delivery control device 102 as browser extension 124. The browser extension 172 is also downloaded to all synchronized devices 106 and stored as browser extension 160. Synchronized devices 106 are devices that a user has authorized for the user's browser's email account. The user must be signed into the browser 158 on each synchronized device 106 in order to have the browser extension 160 installed on the synchronized device 106. The browser extension 160 executes on each synchronized device 106 and registers the synchronized device 106 with the server 104. Installation and execution of the browser extension 160 is only required when the synchronized device 106 is unregistered. Once the synchronized device 106 is registered on the list of registered device 146 on the server 104, the browser extension execution is not needed. Each synchronized device 106, as well as delivery control device 102, is stored in the user's account 140 as a registered device in the list of registered devices 146.

Once a user's synchronized devices 106 are registered with the server 104, one or more of the synchronized devices 106 may be selected for installation of the software product. The provisioning application 122 queries the server 104 for the list of registered devices 146 and upon receipt, displays the list of registered devices 146. The user may select one or more of the registered devices 146 on which to install the software application 162. The provisioning application 122 sends a request to the server 104 to install the software product on each of the one or more selected registered devices 146. The installation queue module 148 directs the selected synchronized device(s) 106 or delivery control device 102 to install the software application 162.

Figure 2:
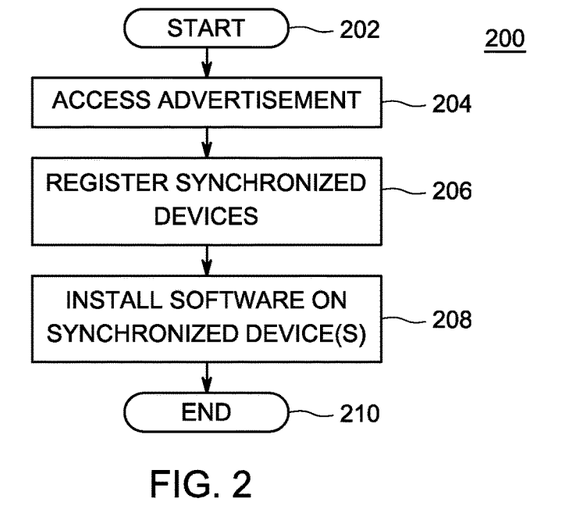
FIG. 2 depicts a flow diagram of a method for remotely delivering software as performed by the provisioning application of FIG. 1, according to one or more embodiments.

FIG. 2 depicts a flow diagram of a method 200 for remotely delivering software as performed by the provisioning application 122 of FIG. 1, according to one or more embodiments. The method 200 accesses an advertisement for a software product from a delivery control device. The method 200 registers, on a software provider's server, devices that are synchronized with the delivery control device and facilitates installation of the software product on one or more of the registered devices. The method 200 starts at step 202 and proceeds to step 204.

At step 204, the method 200 accesses an advertisement for a software product. The advertisement may be a print ad that includes a bar code, a Quick Response code (QR code), a Universal Resource Locator (URL) that may be selected or typed into a browser, or may include any information by which a user can access in order to purchase the software product. Alternatively, the advertisement may be a digital ad that includes a URL. In some embodiments, the delivery control device is a mobile device. The bar code or QR code may be scanned using an optical scanner on a mobile device. Regardless of the method used to access the advertisement, a user is directed to a URL that directs the delivery control device to download a provisioning application from an Application store.

The method 200 proceeds to step 206, where the method 200 registers one or more synchronized devices with a provider of the software product as described in more detail with respect to FIG. 4 below. Once the one or more synchronized devices are registered with the software provider, one or more of the registered devices may be selected for installation of the software product.

The method 200 proceeds to step 208, where the method 200 facilitates installation of the software product on one or more registered devices, as described in more detail with respect to FIG. 5 below. The registered devices are displayed on the delivery control device, where one or more of the registered devices may be selected for installation of the software product, at which time the registered device(s) are directed to install the software product.

The method 200 proceeds to step 210 and ends.

Figure 3:
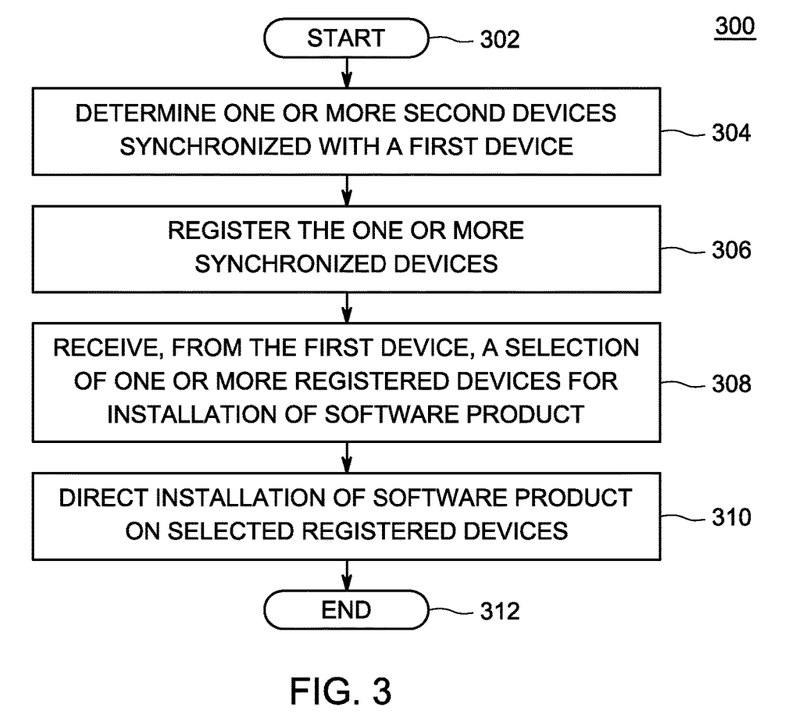
FIG. 3 depicts a flow diagram of a method for remotely delivering software as performed by the provisioning application of FIG. 1, according to one or more embodiments.

FIG. 3 depicts a flow diagram of a method 300 for remotely delivering software as performed by the provisioning application of FIG. 1, according to one or more embodiments. The method 300 enables registration of devices that are synchronized with a first device, for example, a mobile device. After registration, the method 300 enables installation of a software product on one or more of the registered devices from the first device. Prior to execution of method 300, a user accesses an advertisement from a first device, which, as described above with respect to FIG. 2, initiates the installation of a provisioning application on the first device. The method 300 starts at step 302 and proceeds to step 304.

At step 304, the method 300 determines one or more devices that are synchronized with the first device. The method 300 facilitates installing a browser extension onto the first device. A browser can synchronize data (e.g., bookmarks, history, passwords, add-ons, open tabs) with all computers that have browsers associated with a same email account. As such, the first device may be synchronized with other devices. Data that identifies the synchronized devices are stored on a server that manages the email account. For example, a user who has a Gmail account on GOOGLE® CHROME™ has their synchronized device data stored on the GOOGLE® server.

The method 300 proceeds to step 306, where the method 300 registers the one or more synchronized devices. The method 300 facilitates installation of the browser extension on all of the user's synchronized devices. The method 300 directs each synchronized device to install the browser extension from an appropriate application store. For example, if a default browser is GOOGLE® CHROME™, the appropriate application store is the GOOGLE® Play store. In order to install the browser extension, the user must be logged into the browser on the synchronized device using the email account that was used to create the user account. The method 300 facilitates registering each synchronized device with the software provider's server and stores the registered devices in the user's account. The method 300 facilitates execution of the browser extension on each synchronized device, and the browser extension on each synchronized device registers the synchronized device with the software provider's server.

The method 300 proceeds to step 308, where the method 300 receives, from the first device, a selection of one or more registered devices for installation of the software product accessed in the advertisement. The method 300 facilitates sending a request to the software provider's server requesting a list of registered devices. The method 300 facilitates providing the list of registered devices to the first device. If there are no registered devices associated with the first device, step 306 may be repeated in order to attempt to register devices. Because a user must be logged into a web browser on a device in order for the device to be registered, in some embodiments the method 300 may wait until the step 306 results in the registration of at least one device. The method 300 receives a selection of one or more registered devices for installation of the software product.

The method 300 proceeds to step 310, where the method 300 directs the installation of the software product on the one or more selected devices. In some embodiments, the method 300 directs the software provider to place an entry on an installation queue for the selected devices thereby causing the software product to be installed in due course. In other embodiments, the method 300 directs the software provider to send a command to the selected device directing the device to initiate the installation of the software product. The method 300 installs the software production the one or more selected devices. Hence, a user is able to access an advertisement for a software product and have the software product installed on a remote, previously unregistered machine. The method 300 proceeds to step 312 and ends.

Figure 4:
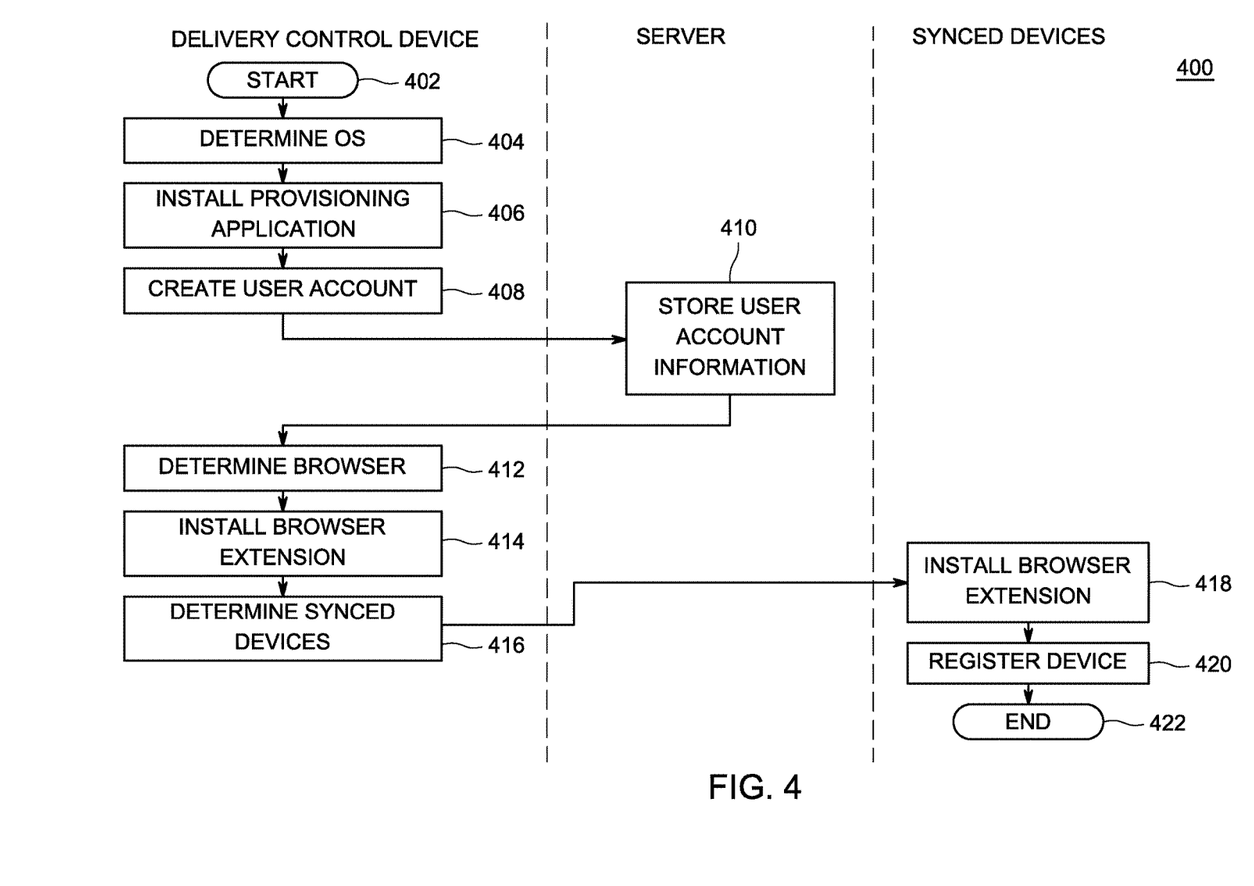
FIG. 4 depicts a flow diagram of a method for registering synchronized devices as performed by the provisioning application and browser extension of FIG. 1, according to one or more embodiments.

FIG. 4 depicts a flow diagram of a method 400 for registering synchronized devices as performed by the provisioning application 122 and browser extensions 124, 160 of FIG. 1, according to one or more embodiments. The method 400 facilitates installing a provisioning application on a delivery control device, which then facilitates installing a browser extension on each device that is synchronized to the delivery control device. The browser extension registers each device with a software provider server. The method 400 starts at step 402 and proceeds to step 404.

At step 404, where the method 400 determines the type of operating system that is installed on the delivery control device and directs a user to an application store associated with the operating system. For example, if the advertisement was accessed from an IPHONE or IPAD, with an iOS, the URL directs the user to the Apple App Store. If the advertisement was accessed from an Android device, the URL directs the user to the GOOGLE Play Store.

The method 400 proceeds to step 406, where the method 400 installs a provisioning application from the application store onto the delivery control device. The provisioning application facilitates registering devices onto which a software product may be remotely installed, as described in more detail below. The method 400 proceeds to step 408, where the method 400 directs a user to a software provider's server in order to create a user account. The user account includes a userID and an email address. The email address must be the same email address that the user uses to log into a default web browser on the user's delivery control device. Information regarding the delivery control device is also provided for the user account. The information may be any delivery control device identifier that is unique to the delivery control device and can be used by the server to identify the delivery control device.

The method 400 proceeds to step 410, where the method 400 stores the user account information and registers the computer by storing the account information. The method 400 stores the userID, email address, and computer identifier in a user account. The account may be a newly created account or the account may be a pre-existing account that is updated with the account information.

The method 400 proceeds to step 412, where the method 400 determines the default browser of the delivery control device. The default browser is stored in settings of the delivery control device. The method 400 directs the user of the delivery control device to an application store based on the user's default browser. For example, if the default browser is GOOGLE® Chrome™, the method 400 directs the user to the GOOGLE Play Store. If the default browser is SAFARI, the method 400 directs the user to the Apple App Store.

The method 400 proceeds to step 414, where the method 400 facilitates installing a browser extension onto the delivery control device. The method 400 proceeds to step 416, where the method 400 determines what devices are synchronized to the user's delivery control device. A browser can synchronize data (e.g., bookmarks, history, passwords, add-ons, open tabs) with all computers that have browsers associated with a same email account. The synchronized devices are stored on a server that manages the email account. For example, a user who has a Gmail account on GOOGLE Chrome has their synchronized devices stored on the GOOGLE server.

The method 400 proceeds to step 418, where the method 400 installs the browser extension on all of the user's synchronized devices. In order to install the browser extension, the user must be logged into the browser on the synchronized device using the email account that was used to create the user account. The method 400 proceeds to step 420, where the method 400 registers each synchronized device with the software provider's server and stores the registered devices in the user's account. The method 400 proceeds to step 422 and ends.

Figure 5:
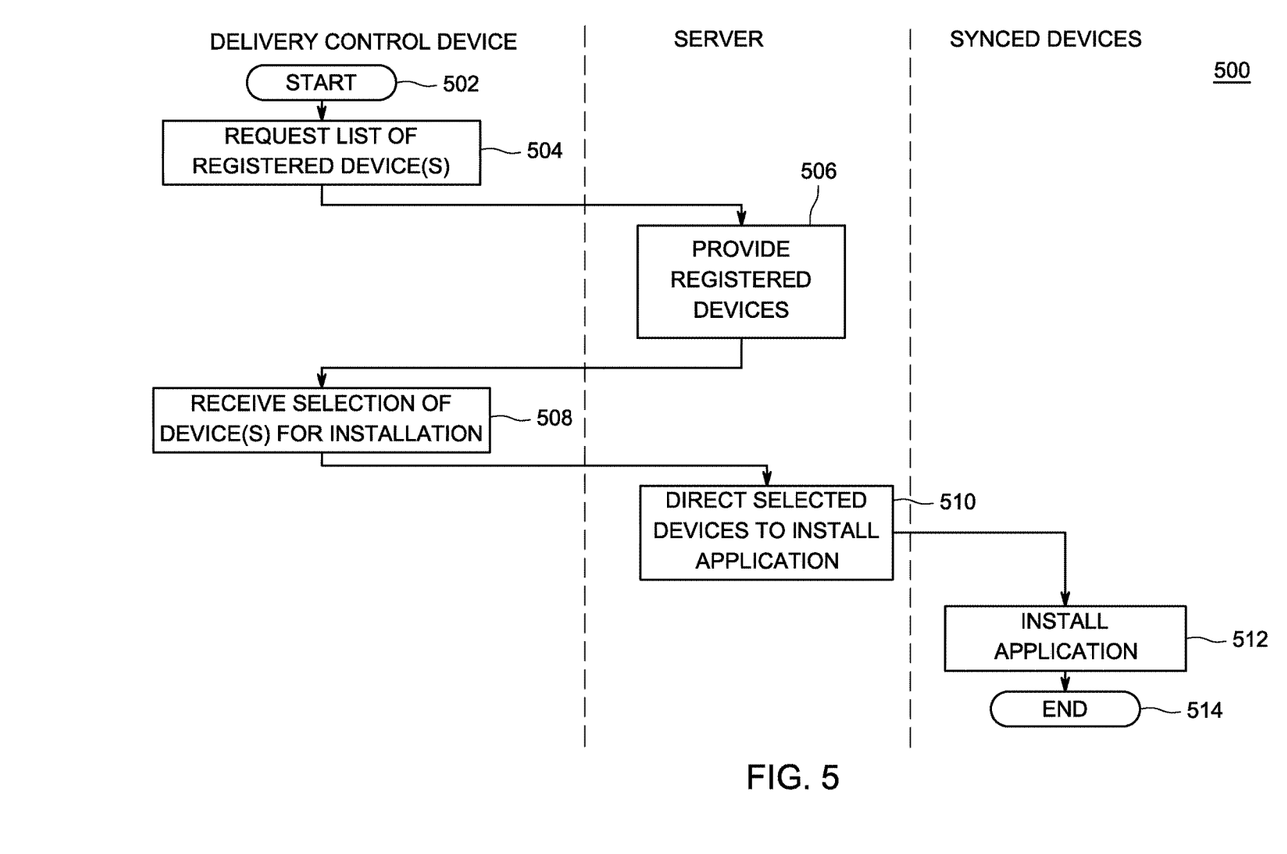
FIG. 5 depicts a flow diagram of a method for facilitating remote installation of software as performed by the provisioning application of FIG. 1, according to one or more embodiments.

FIG. 5 depicts a flow diagram of a method 500 for facilitating installation of the software application on one or more registered devices, as performed by the provisioning application 122 of FIG. 1, according to one or more embodiments of the invention. The method 500 displays one or more registered devices that may be selected for installation of a software product. The method 500 sends a request to the software provider to direct the selected registered devices to install the software application. The method 500 starts at step 502 and proceeds to step 504.

At step 504, the method 500 facilitates sending a request to the software provider's server requesting a list of registered devices. Said registered devices were registered using method 400 above. The method 500 proceeds to step 506, where the method 500 facilitates providing the list of registered devices to the delivery control device. If there are no registered devices associated with the delivery control device, the method 400 may be performed in order to attempt to register devices. Because a user must be logged into a web browser on a device in order for the device to be registered, in some embodiments the method 500 may wait until the method 400 results in the registration of at least one device.

The method 500 proceeds to step 508, where the method 500 receives a selection of one or more registered devices for installation of the software product. The method 500 proceeds to step 510, where the method 500 directs the one or more selected devices to install the software product. In some embodiments, the method 500 directs the software provider to place an entry on an installation queue for the selected devices thereby causing the software product to be installed in due course. In other embodiments, the method 500 directs the software provider to send a command to the selected device directing the device to initiate the installation of the software product. The method 500 proceeds to step 512 where the method 500 installs the software production the one or more selected devices. Hence, a user is able to access an advertisement for a software product and have the software product installed on a remote, previously unregistered machine. The method 500 proceeds to step 514 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
registering a first device with one or more servers of a software provider of a software product;
determining, by the one or more servers, that the first device is synchronized with one or more second devices by identifying the first device and the one or more second devices are logged into a single user account, wherein the one or more second devices are remote from the first device;
detecting, by the one or more servers, that the one or more second devices are not registered with the one or more servers of the software provider of the software product;
directing, by the one or more servers, installation of a browser extension on the one or more second devices to register the one or more second devices with the one or more servers of the software provider of the software product;
receiving, by the one or more servers from the first device, a selection to install the software product on the one or more second devices; and
based on receiving the selection to install the software product, directing, by the one or more servers, installation of the software product on the one or more second devices by sending a command to the one or more second devices that directs the one or more second devices to initiate the installation of the software product.

2. The method of claim 1, further comprising installing a provisioning application on the first device, in response to accessing an advertisement for the software product, wherein the first device is a mobile device.

3. The method of claim 1, wherein determining comprises:
identifying the default browser of the first device;
directing installation, from an application store associated with the default browser, of the browser extension on the first device;
identifying that the single user account is an email account used to log into the default browser on the first device; and
determining that the one or more second devices are logged into the default browser using the identified email account.

4. The method of claim 1, wherein directing installation of the browser extension on the one or more second devices comprises storing device information for the one or more second devices with the software provider.

5. The method of claim 2, wherein the advertisement is at least one of a print advertisement comprising a code that redirects to a Universal Resource Locator (URL) or a digital advertisement that redirects to the URL.

6. The method of claim 5, wherein the URL facilitates installing the provisioning application from an application store associated with an operating system on the first device.

7. The method of claim 1, wherein directing installation of the browser extension on the one or more second devices comprises directing installation of the browser extension from an application store associated with a default browser.

8. A system comprising:
at least one processor;
at least one non-transitory computer readable storage medium storing instructions that, when executed by the at least one processor, cause the system to:
register a first device with one or more servers of a software provider of a software product;
identify a default browser on the first device;
direct installation, from an application store associated with the default browser, of a browser extension on the first device;
identify an email account used to log into the default browser on the first device;
determine one or more second devices that are logged into the default browser using the identified email account, wherein the one or more second devices are remote from the first device;
detect that the one or more second devices are not registered with the one or more servers of the software provider of the software product;
direct the one or more second devices to the application store based on the default browser installed on the first device to cause installation, from the application store, of the browser extension on the one or more second devices;
register, by the browser extension, the one or more second devices with the one or more servers of the software provider of the software product;
receive, from the first device, a selection to install the software product on the one or more second devices; and
based on the selection to install the software product, direct installation of the software product on the one or more second devices by sending a command to the one or more second devices that directs the one or more second devices to initiate the installation of the software product.

9. The system of claim 8, further comprising instructions that, when executed by the at least one processor, cause the system to direct installation of a provisioning application on the first device, in response to accessing an advertisement for the software product, wherein the first device is a mobile device.

10. The system of claim 9, wherein the advertisement is at least one of a print advertisement comprising a code that redirects to a Universal Resource Locator (URL) or a digital advertisement that directs to the URL.

11. The system of claim 10, wherein the URL facilitates installing the provisioning application from an application store associated with an operating system on the first device.

12. The system of claim 8, further comprising instructions that, when executed by the at least one processor, cause the system, after registration of the one or more second devices, to:
receive a query from the first device for a list of the one or more second devices; and
provide the list of the one or more second devices for display on the first device.

13. The system of claim 12, further comprising instructions that, when executed by the at least one processor, cause the system to receive an identifier unique to the first device to identify the first device.

14. A non-transitory computer readable medium storing instructions thereon that, when executed by at least one processor, cause a computer system to:
direct installation of a provisioning application on a first device, in response to accessing an advertisement for a software product;
determine a default browser of the first device;

direct installation, on the first device, of a browser extension associated with the default browser;
register the first device with one or more servers of a software provider of the software product;
determine that the first device is synchronized with one or more second devices by identifying that the first device and the one or more second devices are logged into a single user account, wherein the one or more second devices are remote from the first device;
detect that the one or more second devices are not registered with the one or more servers of the software provider of the software product;
direct the one or more second devices, based on the default browser installed on the first device, to install the browser extension on the one or more second devices;
register the one or more second devices with the one or more servers of the software provider of the software product;
receive, from the first device, a selection to install the software product on the one or more second devices; and
based on the selection to install the software product, direct installation of the software product on the one or more second devices by sending a command to the one or more second devices that directs the one or more second devices to initiate the installation of the software product.

15. The non-transitory computer readable medium of claim 14, wherein the instructions, when executed by the at least one processor, cause the computer system to direct the installation of the provisioning application by:
determining an operating system of the first device; and
directing the installation of the provisioning application from an application store associated with the operating system.

16. The non-transitory computer readable medium of claim 14, wherein the instructions, when executed by the at least one processor, cause the computer system to register the first device by creating the single user account comprising a userID, an email account, and identification of the one or more second devices.

17. The non-transitory computer readable medium of claim 14, wherein the advertisement is at least one of a print advertisement comprising a code that redirects to a Universal Resource Locator (URL) or a digital advertisement that directs to the URL.

18. The non-transitory computer readable medium of claim 17, wherein the URL facilitates installing the provisioning application from an application store associated with an operating system on the first device.

19. The non-transitory computer readable medium of claim 14, further comprising instructions that, when executed by the at least one processor, cause the computer system to:
receive a query from the first device for a list of the one or more second devices; and
provide the list of the one or more second devices for display on the first device.

20. The non-transitory computer readable medium of claim 14, further comprising instructions that, when executed by the at least one processor, cause the computer system to receive an identifier unique to the first device to identify the first device.

\* \* \* \* \*